US009419879B2

(12) United States Patent
Haggar et al.

(10) Patent No.: US 9,419,879 B2
(45) Date of Patent: Aug. 16, 2016

(54) SELECTIVELY REFRESHING ADDRESS REGISTRATION INFORMATION

(71) Applicant: INTERNATIONAL BUSINESS MACHINES CORPORATION, Armonk, NY (US)

(72) Inventors: Jeffrey D. Haggar, Holly Spring, NC (US); Bruce Ratcliff, Red Hook, NY (US); Benjamin T. Rau, Raleigh, NC (US); Jerry W. Stevens, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 207 days.

(21) Appl. No.: 13/922,300

(22) Filed: Jun. 20, 2013

(65) Prior Publication Data

US 2014/0376556 A1 Dec. 25, 2014

(51) Int. Cl.
*H04L 12/28* (2006.01)
*H04L 12/26* (2006.01)
*H04L 29/12* (2006.01)
*G06F 9/455* (2006.01)

(52) U.S. Cl.
CPC ........ *H04L 43/0876* (2013.01); *G06F 9/45558* (2013.01); *H04L 61/10* (2013.01); *H04L 61/2076* (2013.01); *G06F 2009/45595* (2013.01); *H04L 61/103* (2013.01); *H04L 61/2038* (2013.01); *H04L 61/6022* (2013.01)

(58) Field of Classification Search
None
See application file for complete search history.

(56) References Cited

U.S. PATENT DOCUMENTS

| 6,269,098 | B1 * | 7/2001 | Crayford ....................... 370/389 |
| 7,051,188 | B1 | 5/2006 | Kubala et al. |
| 7,428,209 | B1 * | 9/2008 | Roberts ......................... 370/217 |
| 8,031,625 | B2 * | 10/2011 | Knop et al. .................... 370/252 |
| 2002/0156612 | A1 * | 10/2002 | Schulter et al. ................. 703/23 |
| 2002/0156613 | A1 * | 10/2002 | Geng et al. ...................... 703/23 |
| 2002/0196736 | A1 * | 12/2002 | Jin ................................. 370/229 |
| 2003/0041266 | A1 * | 2/2003 | Ke et al. ......................... 713/201 |
| 2005/0198247 | A1 * | 9/2005 | Perry et al. .................... 709/223 |
| 2006/0083243 | A1 * | 4/2006 | Igarashi et al. ................ 370/392 |
| 2006/0294211 | A1 * | 12/2006 | Amato ........................... 709/220 |

(Continued)

OTHER PUBLICATIONS

"z/Architecture—Principles of Operation," IBM Publication No. SA22-7832-09, Tenth Edition, Sep. 2012, pp. 1-1568.

(Continued)

*Primary Examiner* — Ian N Moore
*Assistant Examiner* — Phong La
(74) *Attorney, Agent, or Firm* — Steven Chiu, Esq.; Matthew M. Hulihan, Esq.; Heslin Rothenberg Farley & Mesiti P.C.

(57) ABSTRACT

Facilitating communications within a processing environment. Inbound traffic and outbound traffic on one or more virtual interfaces of the processing environment are monitored for a predefined amount of time. Based on the monitoring, a determination is made as to whether for a selected component of a virtual interface of the one or more virtual interfaces an inbound frame has been received but an outbound frame has not been transmitted for the predetermined amount of time. Based on determining that the inbound frame has been received but the outbound frame has not been transmitted, a generated outbound frame is forwarded to cause address registration information for the virtual interface to be refreshed.

14 Claims, 8 Drawing Sheets

(56) References Cited

U.S. PATENT DOCUMENTS

| | | | |
|---|---|---|---|
| 2007/0195794 A1* | 8/2007 | Fujita et al. | 370/395.53 |
| 2008/0298267 A1* | 12/2008 | Knop et al. | 370/252 |
| 2008/0306706 A1* | 12/2008 | Markovic | 702/141 |
| 2009/0003195 A1* | 1/2009 | Pitchforth, Jr. | 370/218 |
| 2009/0207848 A1* | 8/2009 | Kwan | H04L 45/00 370/397 |
| 2009/0245097 A1* | 10/2009 | Takakuwa | 370/217 |
| 2009/0245258 A1* | 10/2009 | Tanaka et al. | 370/392 |
| 2009/0319604 A1* | 12/2009 | Hatasaki et al. | 709/203 |
| 2010/0070563 A1* | 3/2010 | Baker | H04L 65/1046 709/203 |
| 2010/0136970 A1* | 6/2010 | Mui et al. | 455/435.1 |
| 2010/0185755 A1* | 7/2010 | Hammam et al. | 709/221 |
| 2010/0229168 A1* | 9/2010 | Maeda et al. | 718/1 |
| 2011/0007741 A1 | 1/2011 | Kreeger et al. | |
| 2011/0264934 A1 | 10/2011 | Branover et al. | |
| 2013/0003738 A1* | 1/2013 | Koganti | H04L 61/103 370/392 |
| 2014/0105216 A1* | 4/2014 | McDysan | 370/400 |
| 2014/0348161 A1* | 11/2014 | Koponen et al. | 370/389 |
| 2014/0372582 A1* | 12/2014 | Ghanwani et al. | 709/223 |

OTHER PUBLICATIONS

Office Action in Application No. 14/550,975, dated Jan. 13, 2016, 29 pages.

\* cited by examiner

156

CONNECTION ID TABLE

| ID | INTERFACE | INBOUND / OUTBOUND COUNTERS | SCOPE |
|---|---|---|---|
| ID | INTERFACE | INBOUND / OUTBOUND COUNTERS | SCOPE |
| 202 | 204 | ⋮ 206 | 208 |

200 → (points to first row)

MAC ADDRESS ROUTING TABLE

| ADDRESS | INBOUND / OUTBOUND COUNTERS | OWNER |
|---|---|---|
| ADDRESS | INBOUND / OUTBOUND COUNTERS | OWNER |
| 252 | ⋮ 254 | 256 |

250 → (points to first row)

MONITORING QUEUE

| POINTER TO ENTRY | REFRESH EVENT INDICATOR |
|---|---|
| POINTER TO ENTRY | REFRESH EVENT INDICATOR |
| 272 | ⋮ 274 |

270 → (points to first row)

FIG. 2C

MAC REFRESH PRIMITIVE FORMAT     400

| COMMAND 402 | INITIATOR 404 | SEQUENCE NUMBER 406 ||
|---|---|---|---|
| RETURN CODE 408 || LAN TYPE 410 | RESERVED |
| VERSION # 412 | COMMAND COUNT 414 | RESERVED ||
| LAYER 2 ASSISTS SUPPORTED    416 ||||
| LAYER 2 ASSISTS ENABLED    418 ||||
| LENGTH OF SUBCOMMAND    420 || SUBCOMMAND    422 ||
| SUBCOMMAND SPECIFIC DATA    424 ||||

FIG. 4A

START SUBCOMMAND

| LENGTH OF SUBCOMMAND (0x0C)    440 | SUBCOMMAND = 0x0001    442 ||
|---|---|---|
| FLAGS    444 | REFRESH TIMER    446 | MAC ADDRESS    448 |
| MAC ADDRESS (IF APPLICABLE) |||

FIG. 4B

STOP SUBCOMMAND     470

| LENGTH OF SUBCOMMAND (0x0C)    472 | SUBCOMMAND = 0x0002    474 ||
|---|---|---|
| FLAGS    476 | REFRESH TIMER    478 | MAC ADDRESS    488 |
| MAC ADDRESS (IF APPLICABLE) |||

FIG. 4C

SELECTIVELY REFRESHING ADDRESS REGISTRATION INFORMATION

BACKGROUND

One aspect relates, in general, to network communications, and in particular, to the refreshing of address registration information used in communicating within a network.

Networks, such as Ethernet networks, maintain routing tables to facilitate routing of frames within the network. One example of a routing table is a Media Access Control (MAC) forwarding table that includes MAC addresses used in routing frames within the network. The size of this table varies depending on the size and cost of the physical switch. With the increase in size of Layer 2 Networks in customer data centers, due to the convergence of the 10/100 networks into the 1G/10G networks, the possibility of a MAC forwarding table becoming full has dramatically increased. To help keep the MAC forwarding tables filled with only "active" MAC entries, many switch vendors have adopted a five minute MAC timeout value. This means if a switch port does not receive a packet with a source MAC address which is currently active in the MAC forwarding table over the five minute interval, this MAC address is purged from the forwarding table.

Once the MAC address is purged from the forwarding table, all packets received with a destination MAC address, which is not present in the MAC forwarding table, is broadcast/forwarded to all switch ports associated with the port group. This can cause significant switch and network performance issues depending on the overall Local Area Network (LAN) utilization.

BRIEF SUMMARY

Shortcomings of the prior art are overcome and additional advantages are provided through the provision of a computer program product for facilitating communications within a processing environment. The computer program product includes a computer readable storage medium readable by a processing circuit and storing instructions for execution by the processing circuit for performing a method. The method includes, for instance, monitoring, for a predefined amount of time, inbound traffic and outbound traffic on a virtual interface of the processing environment; determining based on the monitoring whether for a selected component of the virtual interface an inbound frame has been received but an outbound frame has not been transmitted for the predefined amount of time; and based on determining that the inbound frame has been received but the outbound frame has not been transmitted, forwarding a generated outbound frame to cause address registration information for the virtual interface to be refreshed.

Methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE SEVERAL VIEWS OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 2A depicts one example of a connection id table including counters to be used in monitoring;

FIG. 2B depicts one example of a MAC address routing table including counters to be used in monitoring;

FIG. 2C depicts one example of a monitoring queue;

FIGS. 4A-4C depict an example of a format of a refresh primitive;

DETAILED DESCRIPTION

In one aspect, communications within a processing environment are facilitated by refreshing address registration information used in the communications. The address registration information is used to forward frames within the environment, and is maintained in a data structure, such as a routing table. Since the data structure is of a finite size, addresses within the data structure that have not been used in a predefined amount of time are removed from the data structure. Once an address is removed, if a frame arrives destined for that address, the frame is broadcast to a plurality of destinations, instead of the one particular destination, until the address is re-registered. Therefore, in accordance with one aspect, a monitoring capability is provided that monitors network interfaces of the environment for inbound and outbound traffic and takes action if it is determined that for a specified period of time there has been inbound traffic, but no outbound traffic, for a particular interface. The action taken includes refreshing the address registration information for the interface to enable the incoming frames to be forwarded to a particular destination, as intended, rather than broadcast to the plurality of destinations.

In a further embodiment, the monitoring capability monitors particular addresses of one or more interfaces for inbound and outbound traffic and takes action if it is determined for a specified period of time that there has been inbound traffic, but no outbound traffic, for a particular address. Again, the action includes refreshing the address registration information for the interface corresponding to the address.

Figure 1:
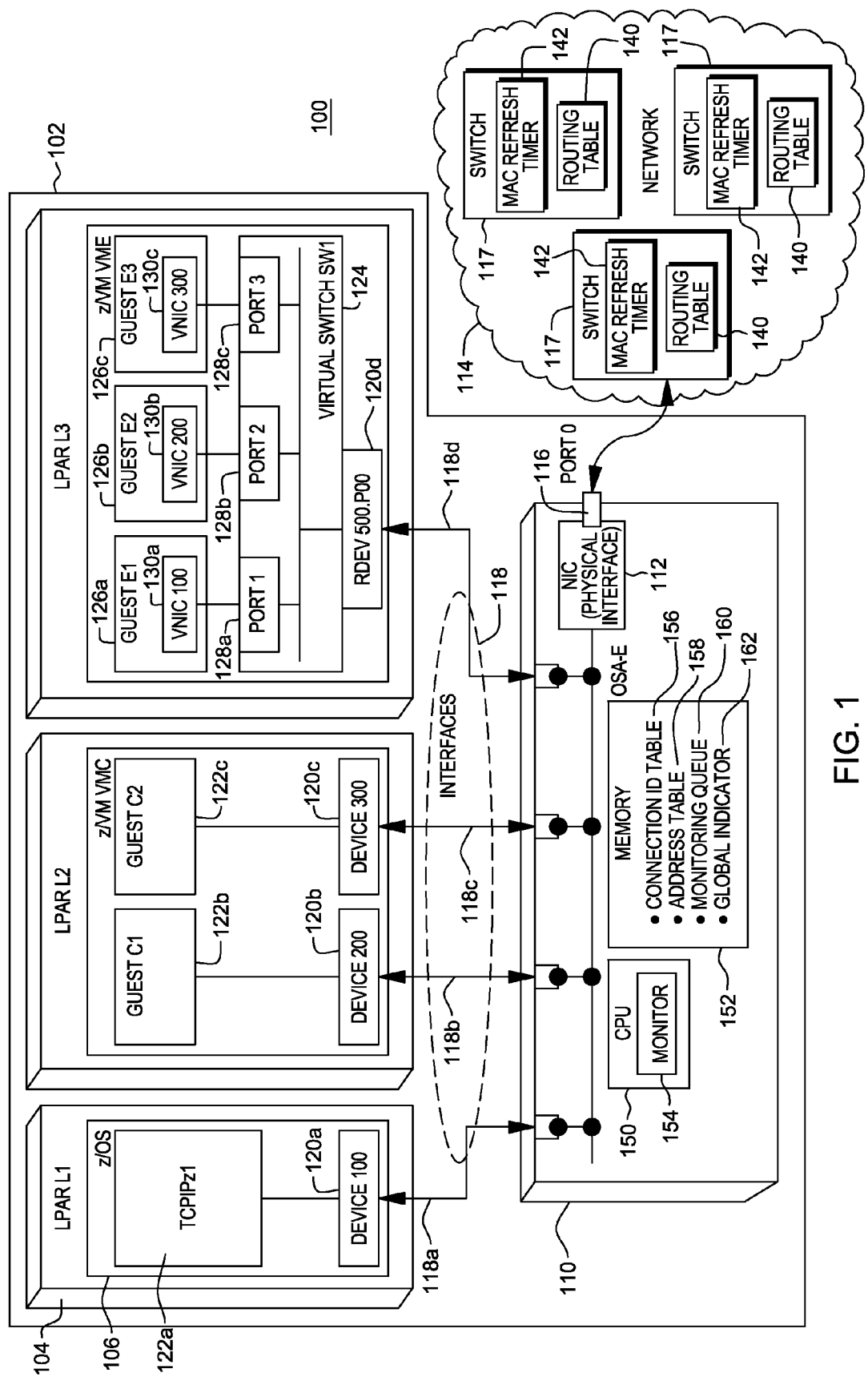
FIG. 1 depicts one embodiment of a processing environment to incorporate and use one or more aspects of a monitoring and refresh capability.

One embodiment of a processing environment to incorporate and use one or more aspects of the monitoring/refresh capability is described with reference to FIG. 1. In one example, a processing environment 100 is based, for instance, on the z/Architecture offered by International Business Machines Corporation, Armonk, N.Y., and includes, for instance, a zSeries server, also offered by International Business Machines Corporation. The z/Architecture is described in a publication entitled "z/Architecture—Principles of Operation," IBM® Publication No. SA22-7832-09, Tenth Edition, September 2012, which is hereby incorporated herein by reference in its entirety. Z/ARCHITECTURE®, ZSERIES®, and IBM® are registered trademarks of International Business Machines Corporation, Armonk, N.Y., U.S.A. Other names used herein may be registered trademarks, trademarks or product names of International Business Machines Corporation or other companies.

In one example, processing environment 100 includes a central processor complex (CPC) 102, having, for instance, one or more partitions or zones 104 (e.g., logical partitions LPAR L1-LPAR L3). Each logical partition has a resident operating system 106, which may differ for one or more of the logical partitions. For example, logical partition 1 includes the z/OS operating system, offered by International Business Machines Corporation; logical partition 2 is executing a z/VM operating system, offered by International Business Machines Corporation; and logical partition 3 is operating an enhanced z/VM operating system. Although in this example, three logical partitions are described, other embodiments can include more, less or the same number of logical partitions. Further, one or more of the partitions may not be executing an operating system, and/or operating systems other than those described herein may be executed. Many other variations are possible. Z/OS® and Z/VM® are registered trademarks of International Business Machines Corporation.

Each logical partition includes one or more logical processors, each of which represents all or a share of a physical processor of the processing environment allocated to the partition. The logical processors of a particular partition may be either dedicated to the partition so that the underlying processor resource is reserved for the partition, or shared with another partition so that the underlying processor resource is potentially available to another partition.

In one embodiment, each logical partition is coupled to a shared network connection, such as an Open Systems Adapter Express (OSA-E) adapter 110. Adapter 110 includes, for instance, a network interface card 112 (a.k.a., a physical interface), at least one processor (e.g., central processing unit (CPU)) 150 and memory 152, each of which is described in further detail below.

Network interface card 112 is the physical interface between the adapter and the logical partitions, and has associated therewith a plurality of virtual interfaces (a.k.a., network interfaces) 118. In one embodiment, each logical partition has one or more virtual interfaces corresponding thereto. For instance, a virtual interface 118a corresponds to a host, such as TCPIPza1 122a, executed by the z/OS operating system executing in LPAR1; a virtual interface 118b corresponds to a host, such as guest C1 122b, executing in LPAR 2; a virtual interface 118c corresponds to a host, such as guest C2 122c, executing in LPAR 2; and a virtual interface 118d corresponds to a virtual switch 124 of the z/VM VME operating system, executing within LPAR 3.

In one implementation, each virtual interface is coupled to a device within a logical partition. For instance, virtual interface 118a is coupled to a device 120a in LPAR 1; virtual interfaces 118b, 118c are coupled to devices 120b, 120c, respectively, in LPAR 2; and virtual interface 118d is coupled to a device 120d in LPAR 3. In turn, device 120a is further coupled to TCPIPz1 122a in LPAR 1; devices 120b, 120c are further coupled to Guest C1 122b, Guest C2 122c, respectively, in LPAR 2; and device 120d is further coupled to virtual switch 124 in LPAR 3.

Virtual switch 124 enables further sharing of data among Guest E1 126a, Guest E2 126b and Guest E3 126c of LPAR 3. The virtual switch includes a plurality of ports 128a, 128b and 128c, each of which is coupled to a respective guest via a virtual network interface 130a, 130b, and 130c, respectively.

The virtual switch allows the guests coupled thereto to communicate with one another without using the adapter or an external network.

Network interface card 112 is coupled to an external network 114 via a port 116. Network 114 includes one or more switches 117 and is used to communicate between the logical partitions of this processing environment and/or with processors of other processing environments. The switch directly coupled to port 116 is referred to as the nearest neighbor switch.

In one example, each switch (or a subset thereof) includes a routing data structure 140, such as a MAC forwarding table, that includes address registration information used in forwarding frames within the processing environment, and a refresh timer 142 (e.g., a MAC refresh timer) that is used to purge the non-accessed entries of the table. In one particular example, in which the network is an Ethernet network, the address registration information includes one or more Media Access Control (MAC) addresses assigned to one or more virtual interfaces of the physical interface.

Returning to adapter 110, processor 150 executes, in accordance with one aspect, a monitor facility 154 that monitors traffic on the virtual interfaces of the processing environment, and selectively refreshes the address registration information, based on the monitoring, as appropriate. The monitoring facility uses information stored in memory 152, including, for instance, one or more of a connection id table 156, an address table 158 (a.k.a., an address routing table), a monitoring queue 160, and a global indicator 162 to determine whether the address registration information is to be selectively refreshed.

In one embodiment, referring to FIG. 2A, a connection id table 156 includes one or more entries 200, and each entry corresponds to a particular virtual interface. Each entry 200 includes, for instance, a connection identifier (ID) 202 assigned to a particular virtual interface to identify that interface; an indication of the virtual interface 204 owned by the connection id; a set of inbound/outbound counters 206 associated with the connection id for tracking incoming and outgoing frames, respectively, for the virtual interface; and a scope indication 208 that indicates whether the virtual interface, as one entity, is being monitored (referred to as interface scope, in which traffic associated with a connection identifier assigned to the virtual interface is being monitored), or whether a particular address of the interface is being monitored (referred to as address scope).

Referring to FIG. 2B, in one embodiment, address table 158, such as a MAC address routing table, also includes a plurality of entries 250. However, for this table, each entry 250 includes, for instance, an address 252, such as a MAC address; a set of inbound/outbound counters 254 for tracking incoming and outgoing frames, respectively, for the address; and an owner indication 256 that is, for instance, the connection identifier owning this address. This connection identifier is used as an index into the connection id table to obtain the connection id entry that owns this address.

As one example, the connection id table includes up to 1920 entries and the MAC address routing table includes up to 4096 entries. However, in other embodiments, other numbers of entries may be included in each table. In one example, the more memory that is available, the greater the number of entries may be included.

Entries are included within the connection id table and MAC address table based on, for instance, creation of a host virtual machine and/or based on an indication that monitoring is to be performed for the virtual interfaces represented in the tables. This indication is provided by, for instance, a refresh primitive, described below, or by a global indicator 162 (FIG. 1). In one implementation, global indicator 162 indicates whether or not monitoring is to be performed for the virtual interfaces of the processing environment. Further, if monitoring is to be performed, a thread sleep value is provided that indicates at what time interval the monitoring is to be performed. The global indicator is set by a System Network Administrator, or automatically based, for instance on, heuristics, and is not to be overridden by individual interfaces. In a further embodiment, the global indicator is not provided.

In addition to the above, monitoring queue 160 is provided that includes entries, from either the connection id table or address table, to be monitored. The entries are provided on the monitoring queue based on receiving refresh primitives indicating the entries are to be monitored or based on the global indicator specifying monitoring. In one example, as shown in FIG. 2C, monitoring queue 160 includes a plurality of entries 270, and each entry includes, for instance, a pointer 272 to a particular table entry of a specified type (e.g., connection id table entry or MAC address routing table entry) depending on the scope of monitoring. The type of entry pointed to by pointer 272 indicates the monitoring scope (e.g., interface or address), or in another embodiment, a separate indicator is included in the queue entry that specifies the monitoring scope. Other variations are also possible.

Further, in one embodiment, each entry 270 includes a refresh event indicator 274 that indicates whether a refresh frame has been sent for this entry to refresh the address registration information in the switch forwarding table. This indicator is used, in one embodiment, to control when the counters associated with the entry are to be checked.

Although examples of data structures (e.g., tables) are shown and described, other examples are possible. Each data structure may be formatted in other ways and/or include additional, less and/or different information. Further, a data structure may include a plurality of data structures coupled to one another. Many variations are possible.

As described herein, since the routing data structures in the switches are of a finite size, not all addresses are included in the data structures. For instance, in an Ethernet network, each Ethernet switch maintains a MAC forwarding table. The size of this table varies depending on the size and cost of the physical switch. With the increase in size of Layer 2 Networks in customer data centers, the possibility of these MAC forwarding tables becoming full has dramatically increased. To help keep the MAC forwarding tables filled with only "active" MAC entries, many switch vendors have adopted a MAC timeout value (a.k.a., a MAC refresh value), such as a five minute interval. This interval is reduced from previous values because of the increase in the size of the Layer 2 Networks. This means if a switch port does not receive a packet with a source MAC address which is currently active in the MAC forwarding table over the specified interval, this MAC address is purged from the forwarding table.

Once the MAC address is purged from the forwarding table, all packets received with a destination MAC address which is not present in the MAC forwarding table will be broadcast/forwarded to all switch ports associated with the port group. This can cause significant switch and network performance issues depending on the overall LAN utilization.

This is problematic for applications, like Sysplex Distributor (SD) and Workload Balancers/Managers (WLM) executed by the operating system, which receive inbound traffic flows on one virtual interface, but send outbound traffic flows on a different interface (e.g., of a different LPAR). Typically, SD and WLM interfaces only send packets outbound on the interface on the SYS/SYN ACK/ACK flow to setup a new connection. After this setup completes, subsequent packets are processed by a different host. The outbound packets are sent with a source MAC address of the responding interface. In many instances, no outbound flows with the source MAC address of the SD or WLM host (e.g., TCPIP) will occur until a new connection is established.

When Sysplex Distributor and Workload Manager interfaces do not have any new connection setups, it is possible no outbound packets on these interfaces are generated. If no new connections are established and the MAC timeout period expires, the MAC address for that host is deleted from the forwarding table. The worst case scenario is when the inbound traffic flows on one virtual interface, but the outbound traffic flows are on a different virtual interface. In this scenario, once the MAC address for the inbound flow is dropped by the switch, there could be a large number of packets being flooded to all switch ports until the MAC address is refreshed with a new connection setup.

Another troublesome example is when the Open Shortest Path First (OSPF) methodology has defined a "Lower Cost" interface which is used to send outbound traffic, but for WorkLoad manager, multiple inbound interfaces are typically used.

In the case where there are many virtual interfaces for a single physical interface, each virtual interface is assigned its own unique MAC address. Each virtual interface is to have its MAC address periodically sent outbound to the LAN to keep the MAC address "active" in the Layer 2 forwarding tables. To ensure this occurs, in one aspect, a monitoring/refresh capability is provided for virtual interfaces that are to partake in the monitoring/refresh capability. With such a capability, special frames are generated outbound on these interfaces, based on the monitoring, to prevent a switch from broadcasting MAC packets destined for the interface to all of its switch ports due to the MAC address being deleted due to outbound inactivity.

As a further embodiment, a virtual interface may have a plurality of MAC addresses assigned thereto, and an outbound frame is sent for each or selected addresses of the interface.

In one aspect, the monitor/refresh capability includes a monitor, such as monitor 154, used to monitor the inbound and outbound traffic on every virtual interface (or a select subset) connected to a physical LAN interface. Over a specified time interval, the inbound and outbound packet counts processed for the MAC address (or addresses) associated with the virtual interface are recorded. The time interval is set, for instance, based on the MAC refresh timer value specified in the nearest neighbor switch (e.g., switch 117) to which the LAN adapter is connected.

As a new host virtual machine is created, a virtual interface for the virtual machine is added to a monitoring queue, such as monitoring queue 160 maintained within memory 152 of adapter 110, if monitoring is to be performed for the virtual interface. During initialization of the interface, a unique MAC address and connection id are created to uniquely identify the virtual interface. Further, during initialization, outbound frames are generated to cause the MAC address to be added to the MAC Forwarding table in the switch. Additionally, in one embodiment, a connection id entry is added to connection id table 156 for this interface, and an address entry is added to MAC address table 158. If multiple MAC addresses are created and assigned to the virtual address, then multiple entries are added to the MAC address table 158. Inbound and outbound counters are also created and included in the tables, as described above.

In one example, as frames are processed for a specific virtual host on the outbound side, the connection id is used to associate the virtual interface of that host to its outbound frame counter associated with the connection id. As outbound frames are sent to the LAN, the counter is incremented. Frames which are sent LPAR to LPAR and not onto the LAN do not increment the outbound counter, since these frames are not seen by the external switch.

LAN frames processed on the inbound side use the destination MAC address in the LAN header to determine the virtual interface. A search of the registered MAC address is performed, and the virtual interface connection id is found in the MAC address table. The inbound frame counter in, for instance, the connection id table is then incremented for each frame processed.

To check the counters, a thread (referred to in one example as a monitor thread or special thread) is defined in, for instance, monitor 154, and is scheduled based on the MAC refresh timer (e.g., five minutes) set in the external switch. For instance, the thread is awoken based on a "sleep" value, which is set based on the MAC refresh timer set in the external switch, as described below. In one implementation, each virtual interface specifies, via, for instance, a refresh primitive, if it wants to participate in the MAC monitor/refresh capability and the timer on which the thread "sleep" value is based. This selectivity is desired since a virtual interface may determine its traffic flows will not fall into any of the categories described above and the MAC refresh issue will not occur. Thus, it does not need monitoring. In another implementation, however, one global setting (e.g., global indicator 162) is used to control the thread "sleep" value, which is controlled by a single System Network Administrator. This value is not capable of being overridden by a virtual interface, in one example.

Each time the monitor thread executes, it interrogates monitoring queue 160. If the counters associated with an entry on the monitoring queue indicate inbound frames have been received for either the interface or address, depending on the type of entry being a connection id entry or address entry, respectively, but outbound frames have not been transmitted, an outbound frame is generated and transmitted by the monitor thread. This frame is received by the external switch and causes address registration information (e.g., the virtual interface's MAC address entry in the forwarding table) to be refreshed in the external switch. After the entry has been checked, the inbound and outbound frame counters are reset.

Further details regarding the monitoring/refresh capability are described with reference to FIGS. 3-7. Commencing with FIG. 3, details are provided relating to certain initialization that occurs to perform the monitoring.

Figure 3:
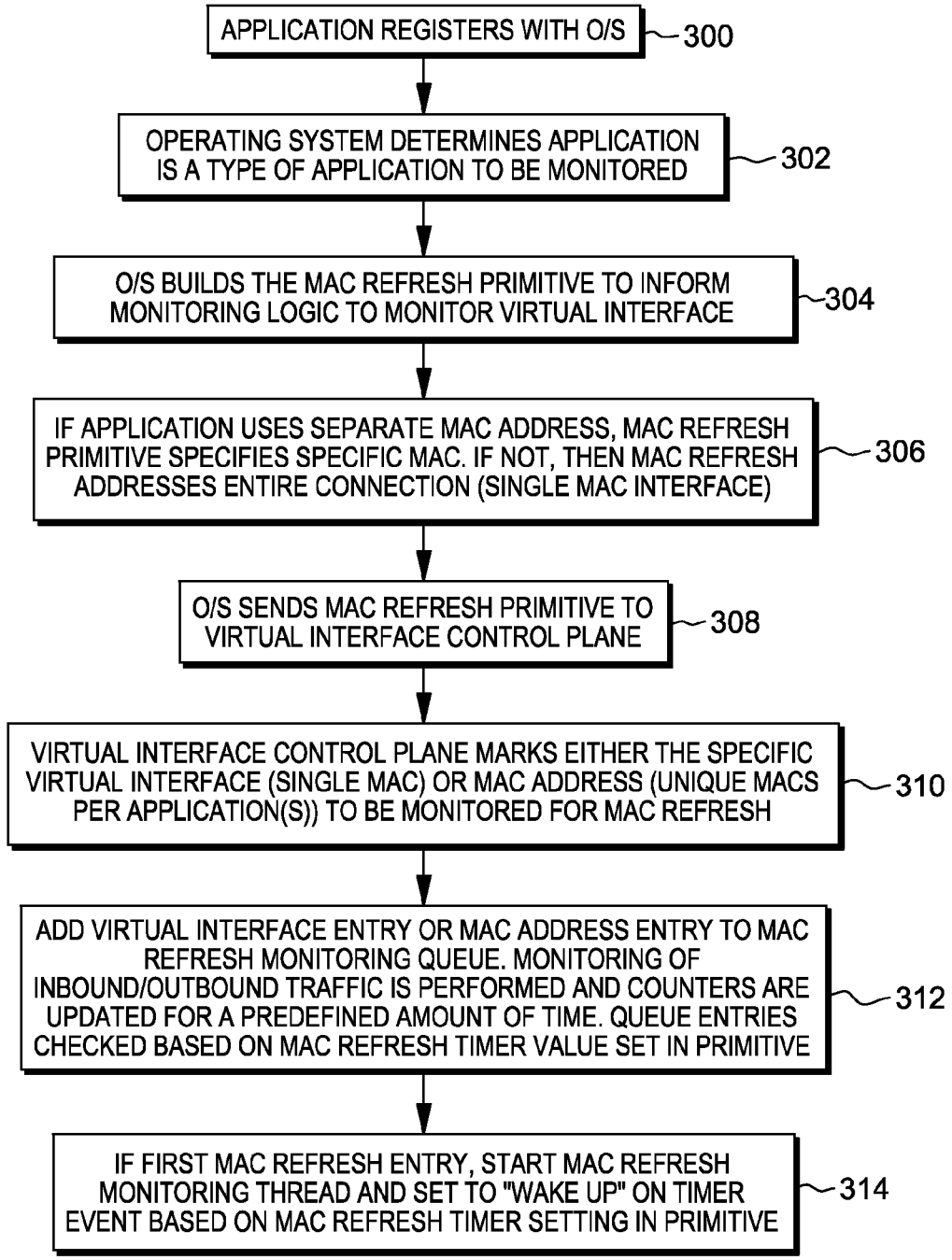
FIG. 3 depicts one embodiment of initialization performed to support the monitoring and refresh capability of one aspect.

Referring to FIG. 3, in one embodiment, initially, an application registers with the operating system (O/S), STEP 300. As one example, an application is started by a Transmission Control Protocol/Internet Protocol (TCP/IP) executed by the operating system. The operating system knows, based on the application type, if it is an application in which refresh of the address registration information could be an issue, such as with Sysplex Distributors or Workload Balancers. As examples, the operating system makes this determination based on an application ID of the application or an application type parameter used when the application starts that describes to the operating system the type of application.

In this example, the operating system determines that the application is a type of application that is to be monitored, such as Sysplex Distributor or Workload Manager, STEP 302, and thus, the operating system builds a refresh primitive, such as a MAC refresh primitive, to inform the monitoring logic to monitor the virtual interface associated with the application, STEP 304. The application may have its own MAC address assigned thereto or it may use the MAC address for the entire connection. If the application uses a separate MAC address, a MAC refresh primitive indicates the specific MAC address, and the scope of the monitoring is address scope. If not, then the MAC refresh primitive uses the MAC address for the entire connection, and the scope of the monitoring is interface scope, STEP 306.

One example of a MAC refresh primitive is described with reference to FIG. 4A. In one example, a primitive 400 includes a command 402 indicating this is a refresh monitoring command; an initiator 404 indicating the initiator of the primitive (e.g., the operating system building the primitive); a sequence number 406; a return code 408; a LAN type 410; a version number 412; a command count 414; Layer 2 assists supported 416; Layer 2 assists enabled 418; a length of a subcommand 420; a subcommand 422; and subcommand specific data 424.

One example of a subcommand is a start subcommand, an example of which is depicted in FIG. 4B. The start subcommand includes, for instance, a length of the subcommand 440; the actual subcommand 442 (e.g., start); one or more flags 444 described below; a refresh timer 446 which is the value of the MAC refresh timer 142 (e.g., five minutes); and one or more MAC addresses 448 that are to be monitored, if applicable. The start subcommand starts the MAC refresh monitoring on a virtual interface or a specific MAC address associated with the virtual interface. The flags include, for instance, an interface scope in which all traffic on the interface is applied to inbound and outbound packet counts; and a MAC address scope in which only traffic associated with a specified MAC address 448 (or select addresses) is applied to outbound and inbound packet counts. The inbound and outbound packet counts are added to the MAC address entries. The MAC address is only applicable when the flags field is set to the MAC address scope.

Another example of a subcommand is the stop subcommand, an example of which is depicted in FIG. 4C. In one example, a stop subcommand 470 includes a length of the subcommand 472; the actual subcommand 474 (e.g., stop); one or more flags 476; a refresh timer 478; and a MAC address 480, if applicable. The stop subcommand disables MAC refresh monitoring previous set with the start subcommand. In one example, the one or more flags, refresh timer and MAC address have the same values as those in the start subcommand.

Returning to FIG. 3, the operating system sends the MAC refresh primitive to the virtual interface, and in particular, a control plane of the virtual interface, STEP 308. The virtual interface marks either the specific virtual interface or MAC address to be monitored for MAC refresh, STEP 310. The marking includes, for instance, selecting either an interface entry from connection id table 156 or an address entry from address table 158 to be placed on the monitoring queue, depending on the monitoring scope indicated in the refresh primitive. The selected entry (i.e., an interface entry from the connection id table, if the monitoring is interface scope, or a MAC address entry from the MAC address table, if the scope is address scope), is added to the monitoring queue, STEP 312. In particular, an entry is added to the monitoring queue, and the monitoring queue entry includes a pointer to a particular entry in the connection id table or address table, depending on the selected entry. The pointer implicitly indicates the type of entry (e.g., connection id entry for interface scope, or address entry for address scope) and/or a separate scope indicator may be included in the queue entry.

Based on adding the entry to the monitoring queue, monitoring of inbound/outbound traffic is performed, and the appropriate counters in the connection id table or address routing table, based on the monitoring scope, are updated for a predefined amount of time. Thereafter, the entries on the monitoring queue are checked based on a timer event, which is based on the refresh timer value set in the primitive. In one example, the timer event is set to a predefined amount less than the refresh timer value. If it is the first refresh entry put on the queue, then the refresh monitoring thread is started and set to wake up on the timer event, STEP 314.

As a particular example, the refresh primitive is used by the operating system when the application first starts, and during initialization phase, inbound and outbound traffic will flow. Once monitoring starts, the monitoring timer (e.g., thread sleep value) is set to, for instance, ½ the MAC refresh timer value. Then, when a refresh event has occurred for a monitoring queue entry (i.e., address registration information has been refreshed for the queue entry), the monitoring queue entry is marked as such in indicator 274 (e.g., indicator is set to 1). Thus, in one embodiment, this entry on the queue is now checked every other sleep timer event. Then, based on outbound application traffic occurring for that entry, in one embodiment, the indicator is reset (e.g., to 0), such that the entry is again checked at ½ the MAC refresh timer. In another embodiment, each entry is checked each time the thread sleep timer expires, and the refresh event indicator is not used.

Figure 5:
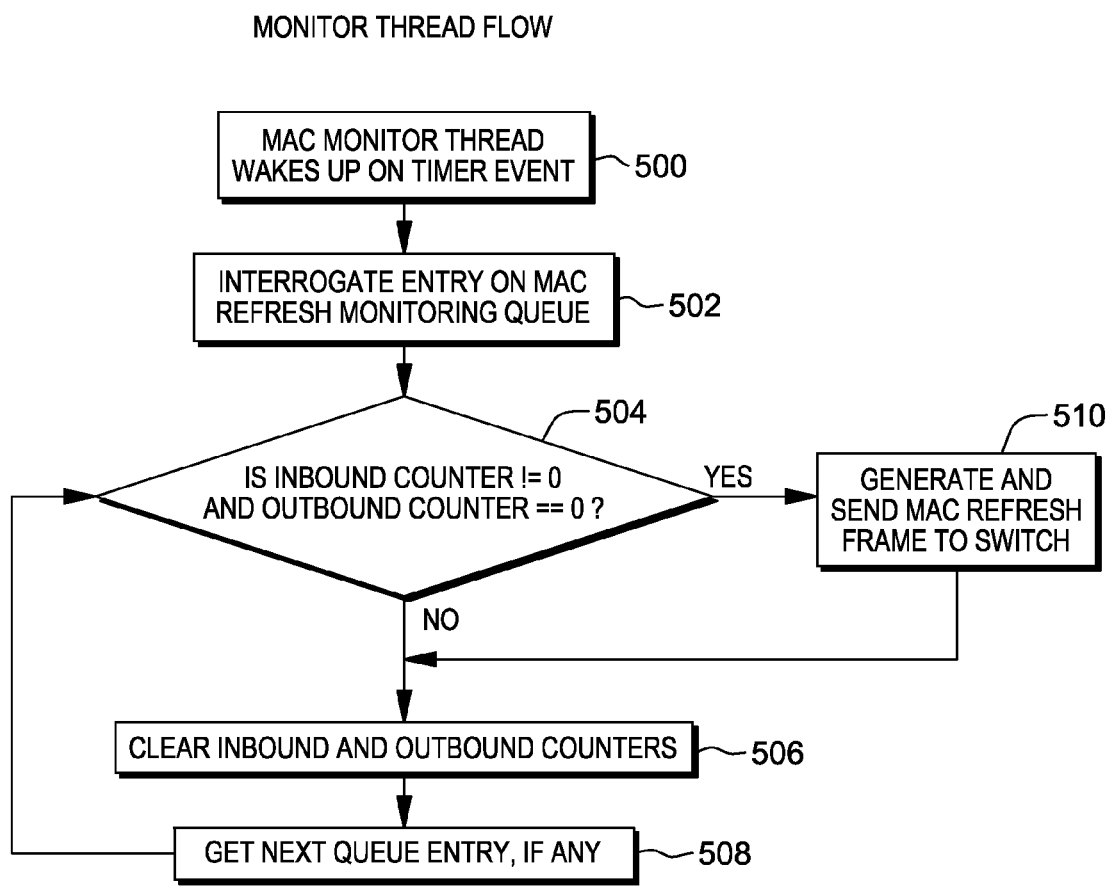
FIG. 5 depicts one embodiment of the logic to monitor inbound/outbound traffic and to selectively refresh address registration information.
Figure 6:
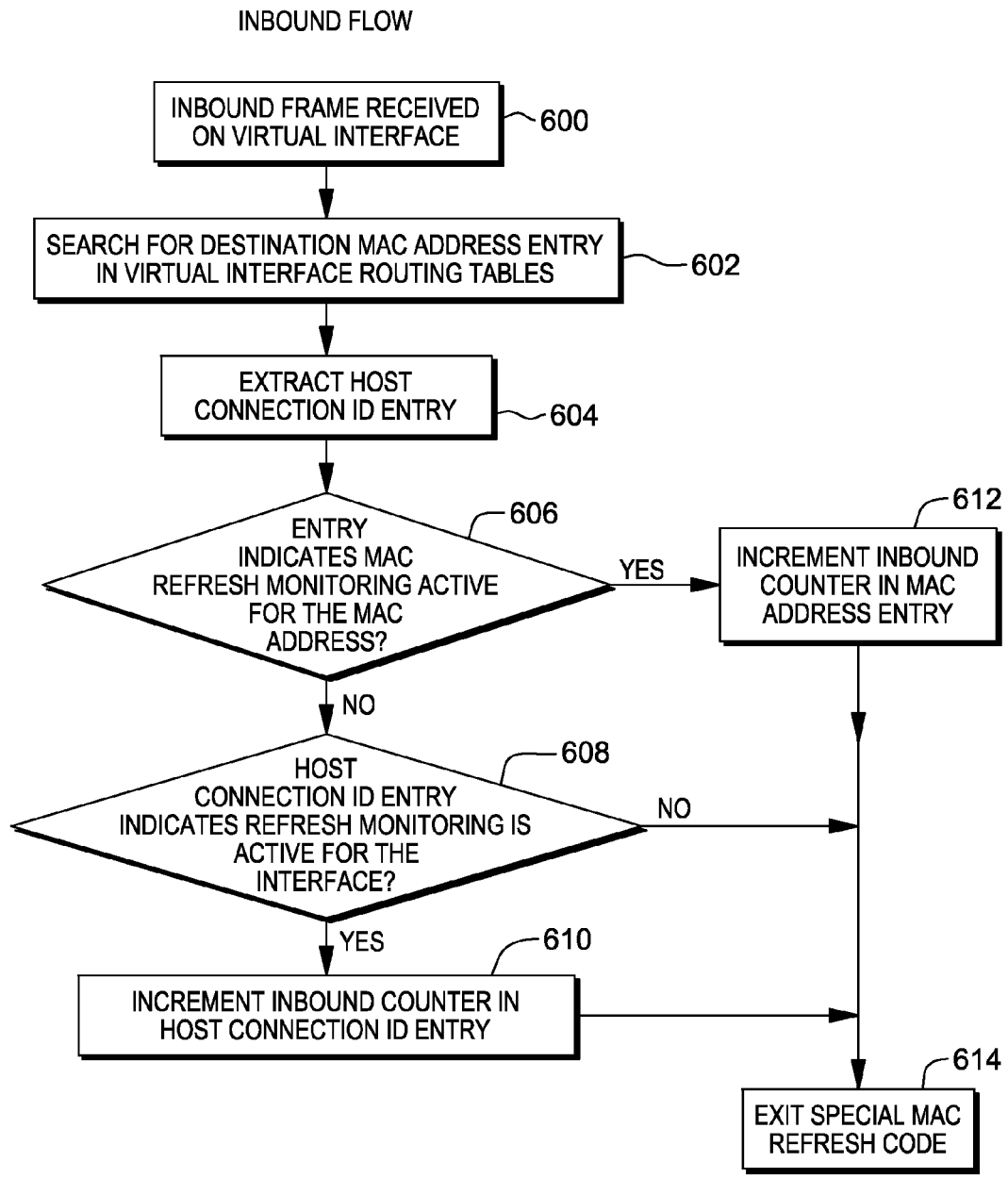
FIG. 6 depicts one example of updating inbound counters.

Referring to FIG. 5, when the timer (e.g., thread sleep value) expires, the counters are checked. In one embodiment, on a particular timer event, the monitor thread of monitor 154 wakes up to check the counters associated with entries on the monitoring queue, STEP 500. For instance, the thread interrogates an entry on the monitoring queue, STEP 502. This entry may be the first entry on the queue, the first entry with a set refresh event indicator, or another selected entry, as examples. Based on the entry type, the thread locates the counters for that entry either in the connection id table or the address routing table. A determination is made as to whether the inbound counter of the entry is not equal (!=) to zero while the outbound counter is equal (==) to zero, INQUIRY 504. If this evaluates to not true, then the inbound and outbound counters of the entry are cleared, STEP 506. Further, the next (or a selected) queue entry, if any, is obtained, STEP 508, and processing returns to INQUIRY 504.

At INQUIRY 504, if the inbound counter is not equal to zero and the outbound counter is equal to zero, then a refresh frame is generated and sent to the switch, STEP 510. The generated frame is received by the external switch and causes address registration information (e.g., the virtual interface's MAC address entry in the forwarding table) to be refreshed in the external switch.

An example frame which is used is a Null Gratuitous Address Resolution Protocol (ARP) Request frame. The contents of this specific frame are, for instance, as follows:
Destination MAC Address: FF:FF:FF:FF:FF—Broadcast
Source MAC Address: Virtual Interface MAC Address
IEEE 802.1Q VLAN Tag if defined on the Virtual Interface
Ethernet Type: 0806 (ARP)
ARP Packet Contents:
Hardware Type: 0001=>Ethernet
Protocol Type: 0800=>IP Protocol Type
Hardware Address Length: 06
Protocol Address Length: 04 (IPv4)
Opcode: 0001=>ARP Request
Source Hardware Address: Virtual Interface MAC Address
Source Protocol Address: 00000000
Destination Hardware Address: 00:00:00:00:00:00
Destination Protocol Address: 00000000

Processing then continues with STEP 506 in which the counters of the entry are cleared, and the next (or a selected) queue entry, if any, is obtained, STEP 508.

As described above, the monitoring logic checks inbound and outbound counters and refreshes address registration information (e.g., one or more MAC addresses) based on those counters. Thus, one embodiment of the logic to update an inbound counter is described with reference to FIG. 6. Initially, an inbound frame is received on a virtual interface, STEP 600, and a search is made for the destination MAC address entry in the virtual interface routing tables (e.g., in MAC address table 158), STEP 602. Based on locating the entry, the owner field is used to extract the corresponding host connection id entry from the connection id table, STEP 604.

Thereafter, a determination is made, based on the scope indicated in the extracted connection id entry, as to whether MAC address refresh monitoring is active (i.e., address scope), INQUIRY 606. If address scope monitoring is not active, then a determination is made as to whether the host connection ID entry indicates refresh monitoring is active for the interface, INQUIRY 608. If refresh monitoring is active for the interface (i.e., interface scope), then the inbound frame counter in the host connection ID entry is incremented, STEP 610, and the MAC refresh code is exited, STEP 614. However, if the host connection ID entry indicates that the refresh monitoring for the interface is not active, INQUIRY 608, then the refresh code is just exited, STEP 614.

Returning to INQUIRY 604, if the MAC address entry indicates MAC refresh monitoring is active for the MAC address, then the inbound frame counter found in the MAC address entry is incremented, STEP 612, and processing continues with exiting the MAC refresh code at STEP 614.

Figure 7:
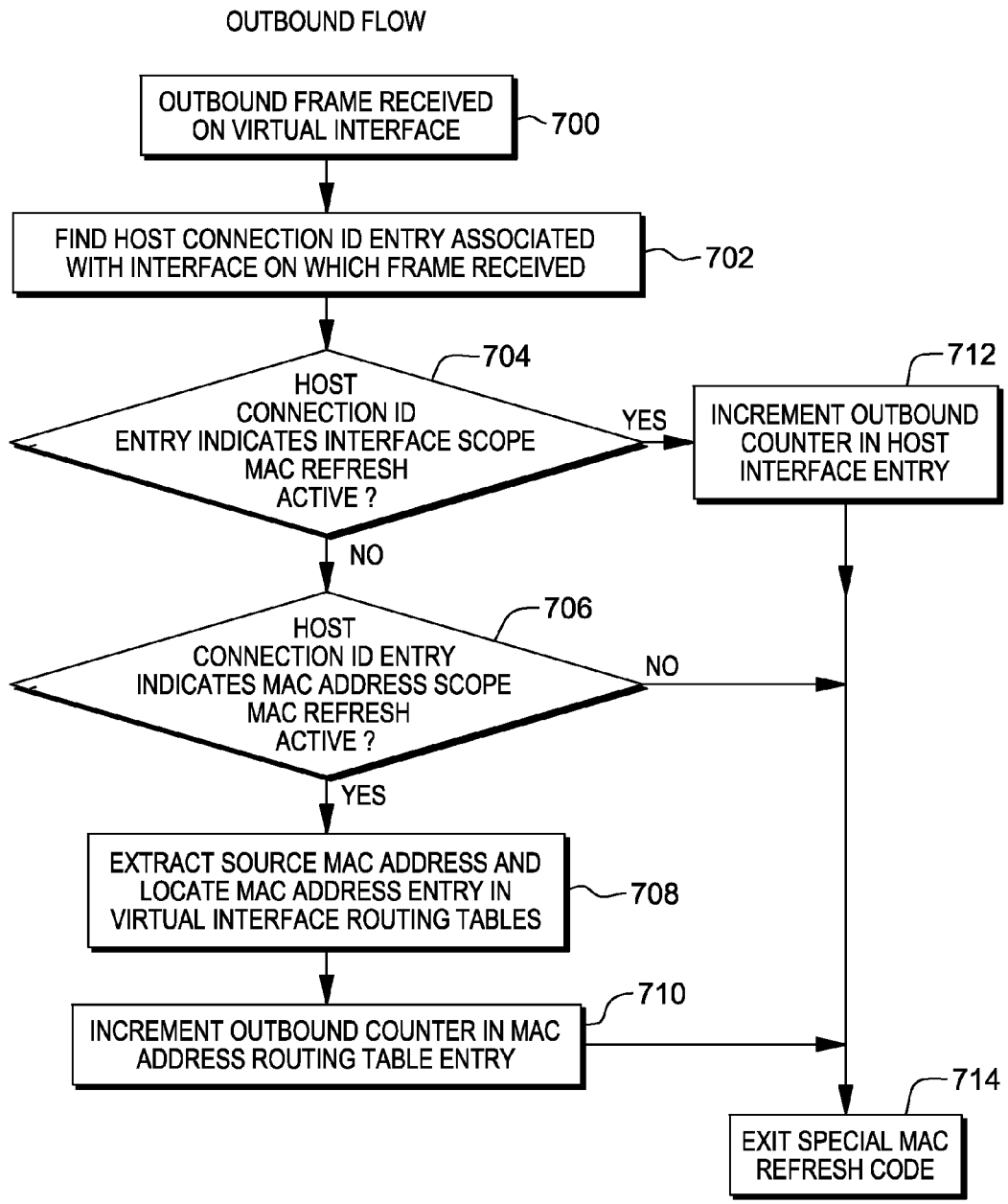
FIG. 7 depicts one example of updating outbound counters.

One embodiment of the logic to update an outbound counter is described with reference to FIG. 7. Initially, an outbound frame is received on the virtual interface, STEP 700, and the host connection ID entry associated with the interface on which the packet is received is located in the connection id table, STEP 702. A determination is made as to whether the host connection id entry indicates that interface scope refresh is active, INQUIRY 704. If interface scope refresh is not active, then a further determination is made as to whether the host connection ID entry indicates MAC address scope refresh is active, INQUIRY 706. If the MAC address scope refresh is indicated as active, then the source MAC address is extracted from the packet, and the MAC address entry for this address is located in the MAC address table, STEP 708. The outbound packet counter found in the MAC address routing table entry is then incremented, STEP 710, and the code is exited, STEP 714.

Returning to INQUIRY 706, if the address scope MAC refresh is not active, then the MAC refresh code is exited, STEP 714. However, returning to INQUIRY 704, if the interface scope MAC refresh indicator is active, then the outbound frame counter in the host interface entry of the connection id table is incremented, STEP 712, and the MAC refresh code is exited, STEP 714.

Described above is a capability of providing a traffic monitor to monitor inbound and outbound traffic on every virtual interface (or a subset of virtual interfaces) connected to a physical LAN interface. In one embodiment, the monitor records the inbound and outbound traffic flows processed for MAC addresses associated with a virtual interface over a specified interval of time based on a MAC refresh timer specified in the nearest neighbor switch connected to the LAN adapter. Additionally, the monitoring includes transmitting dummy outbound frames by the monitor thread for every interface to be monitored on which inbound frames were received, but no outbound frames were transmitted.

In one embodiment, monitoring is performed, for a predefined amount of time, of inbound traffic and outbound traffic on a virtual interface of the processing environment. Based on the monitoring, a determination is made as to whether for a selected component of the virtual interface an inbound frame has been received but an outbound frame has not been transmitted for the predefined amount of time. Based on determining that the inbound frame has been received but the outbound frame has not been transmitted, a generated outbound frame is forwarded to cause address registration information for the virtual interface to be refreshed.

As one example, the selected component is a connection identifier in which all traffic on the virtual interface is monitored. In a further example, the selected component is a routing address in which traffic for that address is monitored.

In another embodiment, monitoring is performed, for a predefined amount of time, of inbound traffic and outbound traffic on a virtual interface of the processing environment, the monitoring is at a selected scope of monitoring, in which the selected scope includes an interface scope in which the virtual interface, as one entity, is monitored, or an address scope in which a particular address of the virtual interface is monitored. Based on the monitoring, a determination is made as to whether the virtual interface, as one entity, or the particular address, depending on the selected scope, has received an inbound frame but has not transmitted an outbound frame for the predefined amount of time. Based on determining that the inbound frame has been received but the outbound frame has not been transmitted, a generated outbound frame is forwarded to cause address registration information for the virtual interface to be refreshed.

The term "frame" as used herein includes any type of unit used to communicate and/or transmit data, including, but not limited to, for instance, a frame, a packet, a unit of data, a unit of communication and/or a unit of transmission.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 8:
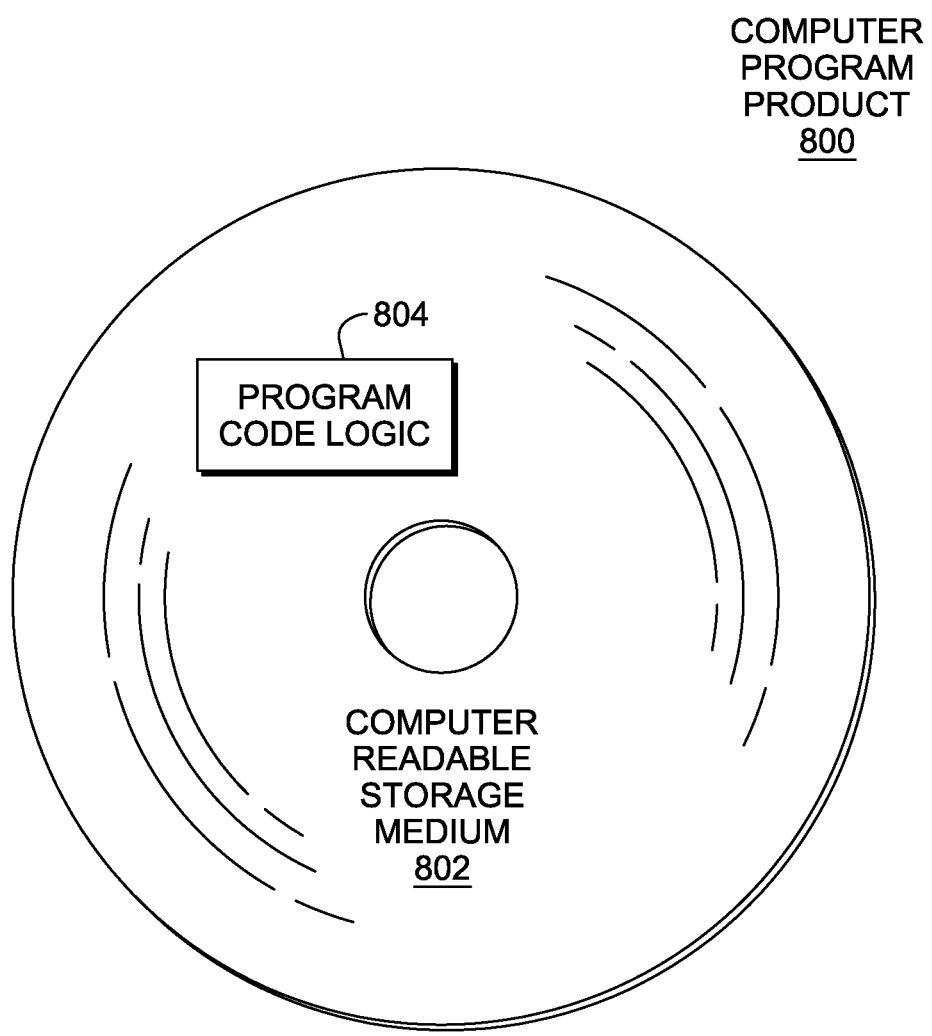
FIG. 8 depicts one embodiment of a computer program product incorporating one or more aspects.

Referring now to FIG. 8, in one example, a computer program product 800 includes, for instance, one or more non-transitory computer readable storage media 802 to store computer readable program code means or logic 804 thereon to provide and facilitate one or more aspects of the present invention.

Program code embodied on a computer readable medium may be transmitted using an appropriate medium, including but not limited to, wireless, wireline, optical fiber cable, RF, etc., or any suitable combination of the foregoing.

Computer program code for carrying out operations for aspects of the present invention may be written in any combination of one or more programming languages, including an object oriented programming language, such as JAVA, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects are described herein with reference to flowchart illustrations and/or block diagrams of methods, apparatus (systems) and computer program products according to one or more embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more aspects. As one example, the deploying of an application comprises providing computer infrastructure operable to perform one or more aspects of the present invention.

As a further aspect, a computing infrastructure may be deployed comprising integrating computer readable code into a computing system, in which the code in combination with the computing system is capable of performing one or more aspects.

As yet a further aspect, a process for integrating computing infrastructure comprising integrating computer readable code into a computer system may be provided. The computer system comprises a computer readable medium, in which the computer medium comprises one or more aspects. The code in combination with the computer system is capable of performing one or more aspects.

Although various embodiments are described above, these are only examples. For example, computing environments of other architectures can incorporate and use one or more aspects of the present invention. Additionally, the information provided in the various tables may differ than that described herein. Additionally, other scopes of monitoring or only one scope of monitoring may be provided. If only one scope of monitoring is provided, that scope is the selected scope without requiring any explicit action. Additionally, other timer and/or thread sleep values are possible. Further, the refresh primitive may include additional, less and/or different information. Many variations are possible.

Further, other types of computing environments can benefit from one or more aspects. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of one or more aspects has been presented for purposes of illustration and description, but is not intended to be exhaustive or limited to the invention in the form disclosed. Many modifications and variations will be apparent to those of ordinary skill in the art without departing from the scope and spirit of one or more aspects. The embodiment was chosen and described in order to best explain the principles of the one or more aspects and the practical application, and to enable others of ordinary skill in the art to understand the one or more aspects for various embodiments with various modifications as are suited to the particular use contemplated.

What is claimed is:

1. A computer program product for facilitating communications within a processing environment, said computer program product comprising:

a non-transitory computer readable storage medium readable by a processing circuit and storing instructions for execution by the processing circuit for performing a method comprising:

monitoring, for a predefined amount of time, inbound traffic and outbound traffic on a virtual interface of the processing environment, wherein the monitoring comprises recording an indication of one or more inbound frames in an inbound counter and an indication of one or more outbound frames, if any, in an outbound counter;

determining based on the monitoring whether for a selected component of the virtual interface an inbound frame has been received on the virtual interface but no outbound frame has been transmitted on the virtual interface to an external network device for the predefined amount of time, the determining comprising checking the inbound counter and the outbound counter, wherein the inbound counter is associated with a connection identifier of the virtual interface based on a scope of the monitoring being an interface scope in which inbound traffic and outbound traffic associated with the connection identifier are monitored, or the inbound counter is associated with a particular address of the virtual interface based on the scope of the monitoring being an address scope in which inbound traffic and outbound traffic associated with the particular address of the virtual interface are monitored; and based on determining that the inbound frame has been received on the virtual interface but no outbound frame has been transmitted on the virtual interface for the predefined amount of time, forwarding a generated outbound frame to cause a refresh of address registration information for the virtual interface to ensure that the address registration information is maintained.

2. The computer program product of claim 1, wherein the selected component comprises an identifier of the virtual interface, in which the determining is based on monitoring inbound traffic and outbound traffic for the virtual interface, as one entity, or the selected component comprises a particular address of the virtual interface, in which the determining is based on monitoring inbound traffic and outbound traffic for the particular address.

3. The computer program product of claim 1, wherein the monitoring is performed at a selected scope of monitoring, the selected scope comprising the interface scope in which inbound traffic and outbound traffic associated with the connection identifier of the virtual interface are monitored, the connection identifier being the selected component, and wherein the determining comprises determining whether the inbound frame has been received for the connection identifier but no outbound frame has been transmitted for the connection identifier, and the forwarding comprises forwarding the generated outbound frame based on determining the inbound frame has been received but no outbound frame has been transmitted.

4. The computer program product of claim 1, wherein the monitoring is performed at a selected scope of monitoring, the selected scope comprising the address scope in which inbound traffic and outbound traffic on the particular address of the virtual interface are monitored, the particular address being the selected component, and wherein the determining comprises determining whether the inbound frame has been received for the particular address but no outbound frame has been transmitted for the particular address, and the forwarding comprises forwarding the generated outbound frame based on determining the inbound frame has been received but no outbound frame has been transmitted.

5. The computer program product of claim 1, wherein the address registration information comprises one or more Media Access Control (MAC) addresses stored in a forwarding table of a switch located within a network of the processing environment.

6. The computer program product of claim 1, wherein the method further comprises generating the generated outbound frame, the generating comprising creating a null gratuitous address resolution protocol (ARP) request frame, said null gratuitous ARP request frame comprising a destination address and a source address.

7. The computer program product of claim 1, wherein the method further comprises indicating that the virtual interface is to be monitored, the indicating employing a refresh primitive, the refresh primitive comprising a start subcommand to indicate monitoring is to be performed.

8. The computer program product of claim 7, wherein the indicating further specifies a scope for the monitoring, the scope comprising the interface scope in which inbound traffic and outbound traffic for the connection identifier of the virtual interface are monitored, or the address scope in which inbound traffic and outbound traffic for the particular address of the virtual interface are monitored.

9. The computer program product of claim 1, wherein the method further comprises initiating the determining based on a timer event, the timer event indicating the predefined amount of time for monitoring has been reached.

10. A computer system for facilitating communications within a processing environment, said computer system comprising:

a memory; and a processor in communications with the memory, wherein the computer system is configured to perform a method, said method comprising:

monitoring, for a predefined amount of time, inbound traffic and outbound traffic on a virtual interface of the processing environment, wherein the monitoring comprises recording an indication of one or more inbound frames in an inbound counter and an indication of one or more outbound frames, if any, in an outbound counter, wherein the inbound counter is associated with a connection identifier of the virtual interface based on a scope of the monitoring being an interface scope in which inbound traffic and outbound traffic associated with the connection identifier are monitored, or the inbound counter is associated with a particular address of the virtual interface based on the scope of the monitoring being an address scope in which inbound traffic and outbound traffic associated with the particular address of the virtual interface are monitored;

determining based on the monitoring whether for a selected component of the virtual interface an inbound frame has been received on the virtual interface but no outbound frame has been transmitted on the virtual interface to an external network device for the predefined amount of time, the determining comprising checking the inbound counter and the outbound counter; and based on determining that the inbound frame has been received on the virtual interface but no outbound frame has been transmitted on the virtual interface for the predefined amount of time, forwarding a generated outbound frame to cause a refresh of address registration information for the virtual interface to ensure that the address registration information is maintained.

11. The computer system of claim 10, wherein the selected component comprises an identifier of the virtual interface, in which the determining is based on monitoring inbound traffic and outbound traffic for the virtual interface, as one entity, or the selected component comprises a particular address of the virtual interface, in which the determining is based on monitoring inbound traffic and outbound traffic for the particular address.

12. The computer system of claim 10, wherein the monitoring is performed at a selected scope of monitoring, the selected scope comprising the interface scope in which inbound traffic and outbound traffic associated with the connection identifier of the virtual interface are monitored, the connection identifier being the selected component, and wherein the determining comprises determining whether the inbound frame has been received for the connection identifier but no outbound frame has been transmitted for the connection identifier, and the forwarding comprises forwarding the generated outbound frame based on determining the inbound frame has been received but no outbound frame has been transmitted.

13. The computer system of claim 10, wherein the monitoring is performed at a selected scope of monitoring, the selected scope comprising the address scope in which inbound traffic and outbound traffic on the particular address of the virtual interface are monitored, the particular address being the selected component, and wherein the determining comprises determining whether the inbound frame has been received for the particular address but no outbound frame has been transmitted for the particular address, and the forwarding comprises forwarding the generated outbound frame based on determining the inbound frame has been received but no outbound frame has been transmitted.

14. The computer system of claim 10, wherein the method further comprises indicating that the virtual interface is to be monitored, the indicating employing a refresh primitive, the refresh primitive comprising a start subcommand to indicate monitoring is to be performed.

\* \* \* \* \*